United States Patent
Schulist et al.

(10) Patent No.: US 9,338,700 B2
(45) Date of Patent: May 10, 2016

(54) INTER-RAT TRANSITIONING UTILIZING SYSTEM INFORMATION MESSAGING

(71) Applicant: QUALCOMM Incorporated, San Diego, CA (US)

(72) Inventors: Matthias Schulist, Erlangen (DE); Akos Ferenc Kezdy, Schwaig b. Nürnberg (DE); Falko Popp, Schwaig b. Nürnberg (DE)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 14/219,933

(22) Filed: Mar. 19, 2014

(65) Prior Publication Data

US 2014/0287753 A1  Sep. 25, 2014

Related U.S. Application Data

(60) Provisional application No. 61/803,661, filed on Mar. 20, 2013.

(51) Int. Cl.
| | |
|---|---|
| *H04W 36/00* | (2009.01) |
| *H04W 36/34* | (2009.01) |
| *H04W 36/14* | (2009.01) |
| *H04W 48/18* | (2009.01) |
| *H04W 88/06* | (2009.01) |

(52) U.S. Cl.
CPC .......... *H04W 36/0022* (2013.01); *H04W 36/14* (2013.01); *H04W 48/18* (2013.01); *H04W 36/34* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2010/0113025 A1 | 5/2010 | Martin et al. | |
| 2013/0028069 A1 | 1/2013 | Pelletier et al. | |
| 2013/0095833 A1* | 4/2013 | Sapiano | H04W 76/041 455/436 |
| 2013/0189987 A1 | 7/2013 | Klingenbrunn et al. | |

(Continued)

FOREIGN PATENT DOCUMENTS

| | | |
|---|---|---|
| WO | WO-2012008887 A1 | 1/2012 |
| WO | WO-2012138283 A2 | 10/2012 |

OTHER PUBLICATIONS

ISA/EPO, International Search Report and Written Opinion of the International Searching Authority, Int'l. App. No. PCT/US2014/031277, Aug. 7, 2014, European Patent Office, Rijswijk, NL, 12 pgs.

(Continued)

*Primary Examiner* — Charles Appiah
*Assistant Examiner* — Margaret G Mastrodonato
(74) *Attorney, Agent, or Firm* — Holland & Hart LLP

(57) ABSTRACT

Methods, systems, and devices are described for transitioning between different radio access technologies (RATs) utilizing system information messages to trigger the transition. Some embodiments may involve utilizing a system information message (e.g., SIB19, SI2quater) that may be received from a serving cell over a first radio RAT (e.g., 2G, 3G, 4G) while in a connected mode with the serving cell. A transition may be initiated from the connected mode with the serving cell to an idle mode with the serving cell in response to the received system information message. A reselection may be performed from the idle mode with the serving cell to a target cell utilizing a second RAT (e.g., 3G, 4G, or 5G) in response to the received system information message.

28 Claims, 14 Drawing Sheets

(56) References Cited

U.S. PATENT DOCUMENTS

| | | | |
|---|---|---|---|
| 2013/0242898 A1* | 9/2013 | Johansson | H04W 24/02 370/329 |
| 2013/0258883 A1 | 10/2013 | Vargas Bautista et al. | |
| 2013/0287002 A1* | 10/2013 | Kim | H04W 36/0066 370/331 |
| 2014/0051426 A1 | 2/2014 | Siomina et al. | |
| 2014/0051428 A1 | 2/2014 | Jung et al. | |

OTHER PUBLICATIONS

"Universal Mobile Telecommunications Systems (UMTS); Radio Resource Control (RCC); Protocol Specification (3GPP TS 25.331 version 11.4.0 Release 11)," ETSI TS 125 331 v11.4.0 (Feb. 2013) Technical Specification, Feb. 2013, European Telecommunications Standards Institute, Sophia Antipolis Cedex, France, 2074 pgs.

* cited by examiner

INTER-RAT TRANSITIONING UTILIZING SYSTEM INFORMATION MESSAGING

CROSS REFERENCES

The present application for patent claims priority to U.S. Provisional Patent Application No. 61/803,661 by Schulist, entitled "INTER-RAT TRANSITIONING UTILIZING SYSTEM INFORMATION MESSAGING," filed Mar. 20, 2013, which is assigned to the assignee hereof, and expressly incorporated by reference herein.

BACKGROUND

The following relates generally to wireless communication, and more specifically to reselection procedures between systems that include different radio access technologies (RATs). Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell.

In some deployments that may involve different radio access technologies (RATs), connected mode handover between different RATs, such as 3G (e.g., UMTS) to 4G (e.g., LTE), may not be supported. In some cases, a UE may utilize idle mode procedures to return from 3G to 4G, though these procedures may take a long time.

SUMMARY

The described features generally relate to one or more improved systems, methods, and/or apparatuses for transitioning between different RATs utilizing system information messages to trigger the transition. Some embodiments utilize a system information message that may be received from a serving cell over a first RAT while in a connected mode with the serving cell. A transition may be initiated from the connected mode with the serving cell to an idle mode with the serving cell in response to the received system information message. A reselection may be performed from the idle mode with the serving cell to a target cell utilizing a second RAT in response to the received system information message.

Initiating the transition may include indicating a radio link failure (RLF). Some embodiments utilize a system information block, such as a SIB19 broadcast of a serving 3G cell, and the respective UE detection during 3G Radio Resource Control (RRC) connected state as trigger or indicator for a UE initiated combined connected to idle mode transition and consecutive 3G to 4G reselection. Based on detection of SIB19 in RRC Dedicated Channel (DCH) connected state, the UE may trigger a signaling connection release indication (SCRI) in order to initiate a 3G RRC connection release. Once moved to RRC idle by the 3G network, the UE may promptly commence, or immediately start, a non-blind reselection attempt from 3G to 4G.

As a UE may typically be "blind" to the 4G network during 3G connected mode (since no compressed mode may be available if 3G to 4G handover is not implemented), the network broadcast of SIB19 on a 3G cell may indicate that there is a high probability and very good chance of an available and underlying 4G coverage. In addition, SIB19 may provide carrier frequency information which will be very beneficial in multi-layer/multi-band LTE deployments and which helps to accelerate the 4G reselection process. The broadcast SIB19 information may lead to an allowed public land mobile network (PLMN) (e.g., home PLMN (HPLMN), equivalent home PLMN (EHPLMN), visited PLMN (VPLMN)), which may avoid scanning or attempting on non-allowed PLMNs. In addition, some embodiments may allow for preserving the current packet data protocol (PDP) context and thus may keep impact on a data session to a minimum.

Similar tools and techniques may be utilized to transition between different RATS, such as between a 2G (e.g., GSM) to 3G (e.g., UMTS) RAT or 4G (e.g., LTE), such as through utilizing SI2quater messaging. Other system information messaging may be utilized such as neighbor lists.

Some embodiments include a method of reselection in a wireless communications system. The method may include: receiving, at a user equipment (UE), a system information message from a serving cell over a first radio access technology (RAT) while in a connected mode with the serving cell; initiating, at the UE, a transition from the connected mode with the serving cell to an idle mode with the serving cell in response to the received system information message; and/or performing a reselection from the idle mode with the serving cell to a target cell utilizing a second RAT in response to the received system information message.

Some embodiments include a wireless communications system, which may include: means for receiving, at a user equipment (UE), a system information message from a serving cell over a first radio access technology (RAT) while in a connected mode with the serving cell; means for initiating, at the UE, a transition from the connected mode with the serving cell to an idle mode with the serving cell in response to the received system information message; and/or means for performing a reselection from the idle mode with the serving cell to a target cell utilizing a second RAT in response to the received system information message.

Some embodiments include a computer program product for wireless communication that may include a non-transitory computer-readable medium, which may include: code for receiving, at a user equipment (UE), a system information message from a serving cell over a first radio access technology (RAT) while in a connected mode with the serving cell; code for initiating, at the UE, a transition from the connected mode with the serving cell to an idle mode with the serving cell in response to the received system information message; and/or code for performing a reselection from the idle mode with the serving cell to a target cell utilizing a second RAT in response to the received system information message.

Some embodiments include a communications device for wireless communication that may include at least one processor that may be configured to: receive, at a user equipment (UE), a system information message from a serving cell over a first radio access technology (RAT) while in a connected mode with the serving cell; initiate, at the UE, a transition from the connected mode with the serving cell to an idle mode with the serving cell in response to the received system information message; and/or perform a reselection from the idle mode with the serving cell to a target cell utilizing a second RAT in response to the received system information message.

In some embodiments, the system information message includes a system information block (SIB). The SIB may include a SIB19 in some cases. The SIB may include a SI2quater in other cases. The system information message may include a neighbor list, information indicating underlying coverage by the second RAT, carrier frequency information regarding the second RAT, or information directing the UE to an allowed public land mobile network (PLMN).

In some embodiments, receiving the system information message occurs during an RRC connected state. Initiating the transition may include initiating a connection release in response to the received system information message. In other examples, initiating the transition may include indicating a radio link failure (RLF) of a radio link with the first cell. Some embodiments include transmitting a signaling connection release indication in order to initiate the connection release.

In some embodiments, the first RAT includes a 3G RAT. Alternatively, the first RAT may include a 2G RAT or a 4G RAT. In some embodiments, the second RAT includes a 4G RAT. Alternatively, the second RAT may include a 3G RAT or a 5G RAT.

In some embodiments, the wireless communications system is configured without support for an inter-RAT handover from the first RAT to the second RAT and/or autonomous handover of the UE from the first RAT to the second RAT. Some embodiments include ignoring a timer during the idle mode. Some embodiments include forgoing utilizing additional system information messages received from the first cell during the idle mode.

In some embodiments, the received system information directs the UE to an allowed PLMN. Some embodiments include preserving a current PDP context from prior to receiving the system information message at least until after performing the reselection.

In some embodiments, initiating the transition to the idle mode occurs while the UE is scheduled to receive data from the first cell. In some cases, the reselection includes a non-blind attempt. Performing the reselection may be commenced promptly after transitioning to the idle mode.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
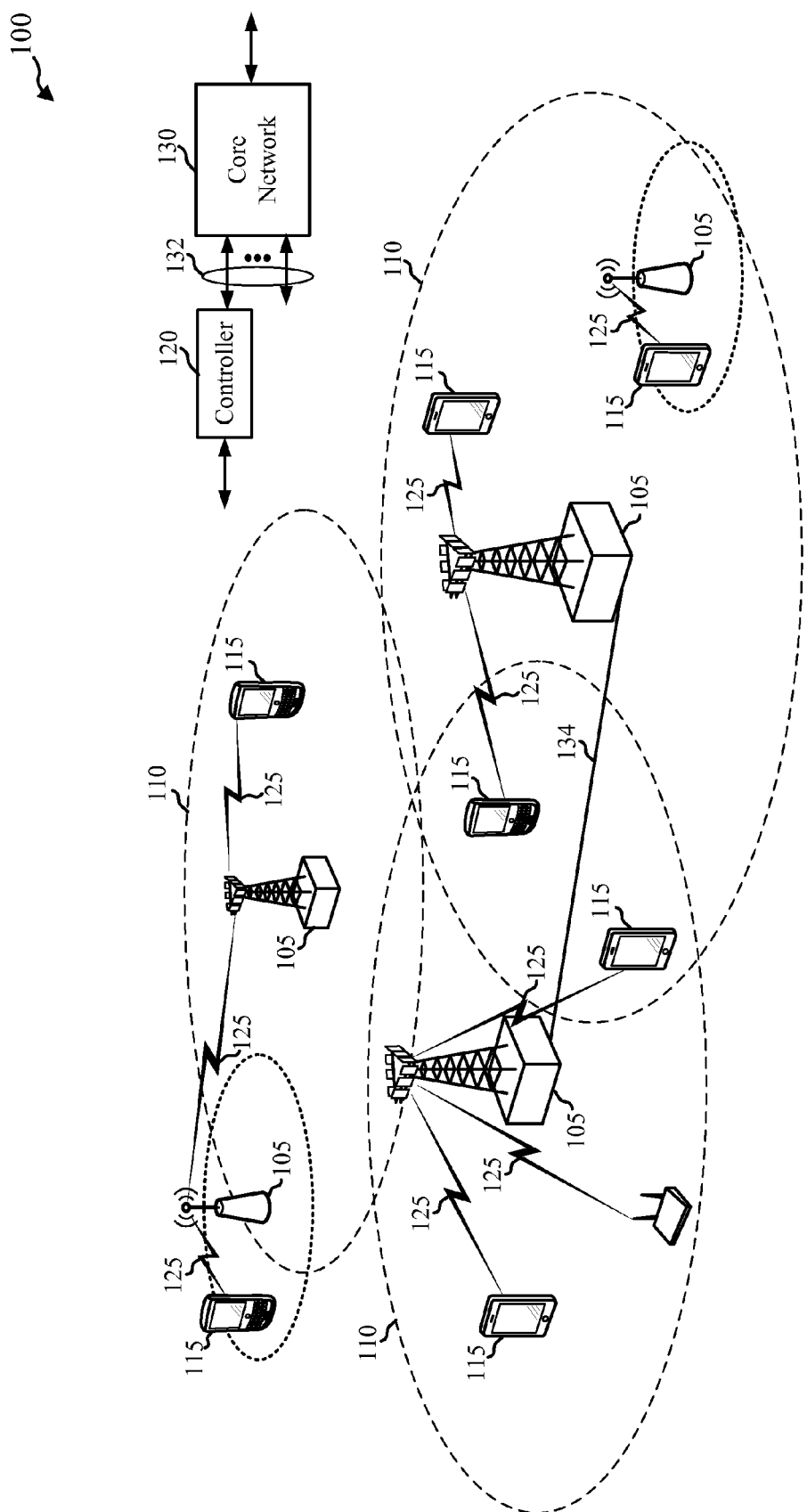
FIG. 1 is a diagram illustrating an example of a wireless communications system in accordance with various embodiments.

The described features generally relate to one or more improved systems, methods, and/or apparatuses for transitioning between different RATs utilizing system information messages to trigger the transition. Some embodiments may involve utilizing a system information message that may be received from a serving cell over a first radio access technology (RAT) while in a connected mode with the serving cell. A transition may be initiated from the connected mode with the serving cell to an idle mode with the serving cell in response to the received system information message. A reselection may be performed from the idle mode with the serving cell to a target cell utilizing a second RAT in response to the received system information message.

These tools and techniques may address a variety of different problems that may exist in transitioning within multi-RAT deployments. For example, in some deployments of 3G (e.g., UMTS) and 4G (e.g., LTE) systems, connected mode handover from 3G to 4G may not be supported—e.g., the system may be configured such that it does not support connected mode handover. A user equipment that is connected to a 3G serving cell (e.g., due to leaving an LTE coverage area or after performing a circuit-switched fallback procedure for a voice call) may remain connected to 3G as long as any data activity is ongoing—even with very low data rate or data volume. This may be a likely scenario for today's 4G LTE smartphones or data modems that constantly run any (background) data activities. User and system perception may suffer from this in that the device may appear somehow "UMTS-sticky".

In systems in which infrastructure configured without support for, or in which vendors or network operators do not support, inter-RAT handover from 3G to 4G, the UE may utilize idle mode re-selection procedures for the return from 3G to 4G. Such idle mode procedures may suffer from the fact that they take a long time, are blind (i.e., without any measurements on the target 4G RAT) or 4G measurements have to be postponed until the device has stopped any data activity, which might impact user perception.

Irrespective of such measurements, there may still be the risk that no LTE RAT may be reliably available due to lack of coverage and/or the device may be configured to continue any activity while connected to 3G—e.g., measurements and data activity suspension may not be successful or they may result in wasted, or inefficiently used, time and UE power. Additionally, a UMTS-sticky UE may result in a poor user experience and/or a negative user perception of a device or experience.

Some embodiments address these issues by utilizing a system information message, such as SIB19 broadcast, of the serving 3G cell and the respective UE detection during 3G RRC connected state, as a trigger or indicator for a UE initiated combined connected to idle mode transition and consecutive 3G to 4G reselection. Based on detection of SIB19 in RRC DCH connected state, the UE may trigger a signaling connection release indication (SCRI) in order to initiate a 3G RRC connection release. Once moved to RRC idle by the 3G network, the UE may immediately start a non-blind reselection attempt from 3G to 4G.

As a UE may typically be "blind" to the 4G network during 3G connected mode (since no compressed mode may be available if 3G to 4G handover is not implemented), the network broadcast of SIB19 on a 3G cell may indicate that there is a high probability and very good chance of an available and underlying 4G coverage. In addition, SIB19 may provide carrier frequency information which may be beneficial in multi-layer/multi-band LTE deployments and which may help to accelerate the 4G reselection process. The broadcast SIB19 information may lead to an allowed PLMN (e.g., HPLMN, EPLMN, VPLMN), which may avoid scanning or attempting reselection on non-allowed PLMNs. In addition, some embodiments may allow for preserving the current PDP context and thus may minimize impact on a data session.

Similar tools and techniques may be utilized to transition between different RATS, such as between a 2G (e.g., GSM) to 3G (e.g., UMTS) RAT or 4G (e.g., LTE), such as through utilizing SI2quater messaging. Additionally or alternatively, similar tools may be employed in transitioning from 4G (e.g., LTE) to subsequent RATs which may include post-release 10 versions of LTE, and which may generally be referred to as 5G RATs herein.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes base stations (or cells) 105, communication devices 115, and a core network 130. The base stations 105 may communicate with the communication devices 115 (generally referred to herein as user equipment (UE)) under the control of a base station controller 120, which may be part of the core network 130 or the base stations 105 in various embodiments. In some cases, controller 120 may be positioned between the core network 130 and one or ore base stations 105. Base stations 105 may communicate control information and/or user data with the core network 130 through backhaul links 132. Backhaul links may be wired backhaul links (e.g., copper, fiber, etc.) and/or wireless backhaul links (e.g., microwave, etc.). In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies. In some embodiments, the system 100 may include different radio access technologies, such as 3G (e.g., UMTS) and 4G (e.g., LTE) RATs. Other examples may include 2G (e.g., GSM) RATs and/or 5G (e.g., LTE releases 11 and later) RATs. The coverage of different base stations or cells 105 that may utilize these different RATs may overlap.

Some embodiments may include LTE/LTE-A RATs where the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The UEs 115 are dispersed throughout the wireless network 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate in general with the different base stations 105, which may include base stations or cells 105 that may utilize different radio access technologies, such as 2G, 3G, 4G, and/or 5G RATs.

The transmission links 125 shown in network 100 may include uplink (UL) transmissions from a user equipment 115 to a base station 105, and/or downlink (DL) transmissions, from a base station 105 to a mobile device 115. The downlink transmissions may also be called forward link transmissions while the uplink transmissions may also be called reverse link transmissions.

Different aspects of system 100 may be configured to support transitioning between different RATs utilizing system information messages to trigger the transition. Some embodiments may involve utilizing a system information message that may be received at a UE 115 from a serving cell 105 over a first radio access technology (RAT) while in a connected mode with the serving cell 105. A transition may be initiated by the UE 115 from the connected mode with the serving cell 105 to an idle mode with the serving cell 105 in response to the received system information message. A reselection may be performed from the idle mode with the serving cell 105 to a target cell 105 utilizing a second RAT in response to the received system information message.

Other aspects of system 100, such as core network 130, controller 120, and/or base stations/cells 105 may be configured to prompt the transition between different RATs. For example, a first cell 105 utilizing a first radio access technology (RAT) may be identified. A second cell 105 utilizing a second RAT may be identified, where a coverage of the second cell 105 may underlie the first cell 105. A system information message may be generated to prompt a user equipment 115 to transition from a connected mode with the first cell 105 to an idle mode with the first cell 105 and performing a reselection from the first cell 105 to a target cell 105 utilizing a second RAT in response to the system information message. The system information message may be transmitted to the user equipment 115.

Further examples and details regarding different embodiments of these transition tools and techniques between different RATs are described in more detail herein.

Figure 2:
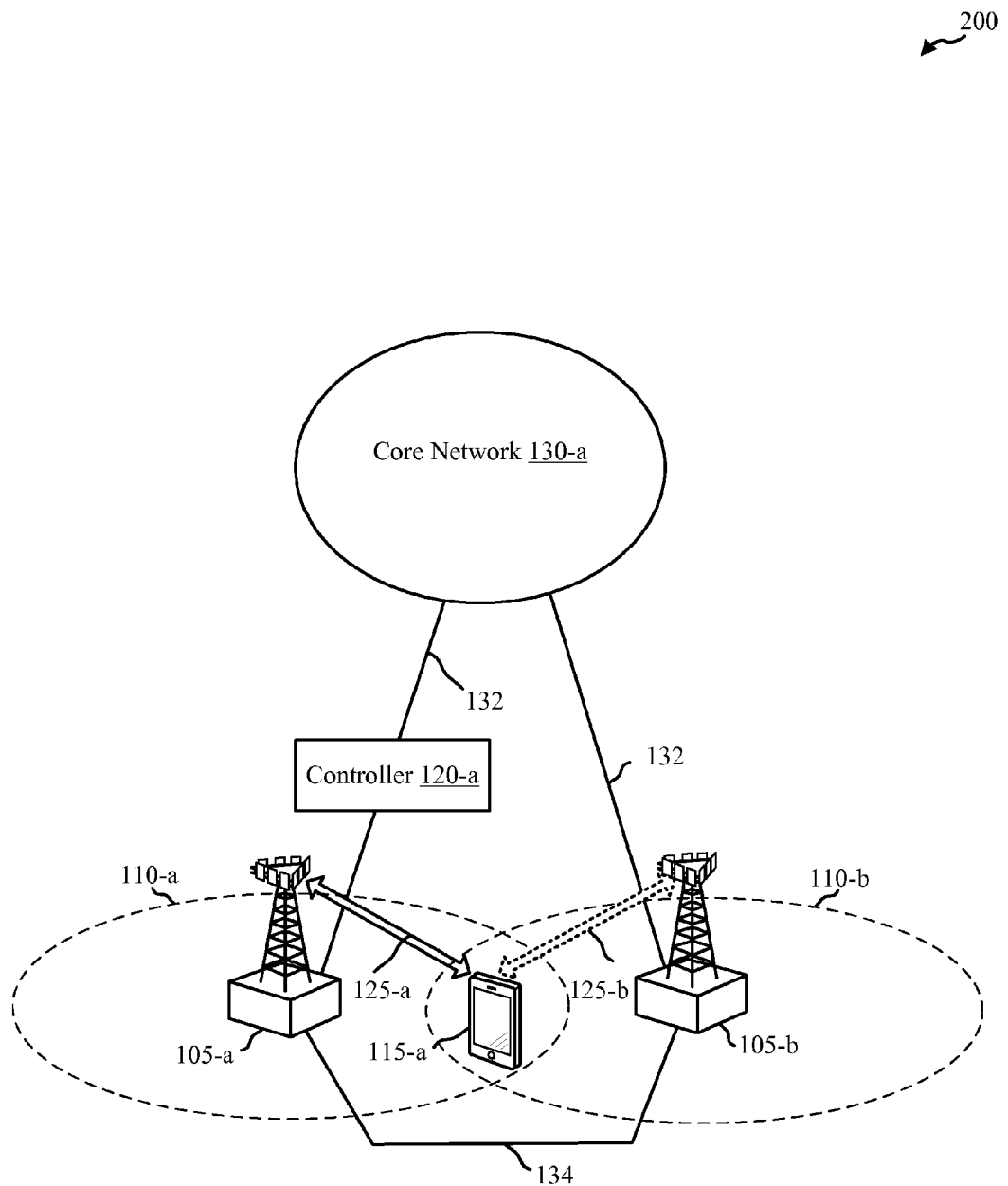
FIG. 2 illustrates aspects of a wireless communications system in accordance with various embodiments.

FIG. 2 illustrates a wireless communications system 200 supporting reselection in accordance with various embodiments. Wireless communications network 200 may illustrate, for example, aspects of wireless communications networks 100. Wireless communications system 200 may include base stations 105-a and 105-b connected via backhaul links 132 to core network 130-a. The base stations 105-a and 105-b may be connected with each other via backhaul link 134. Wireless communications system 200 may include controller 120-a, which may be connected to core network 130-a and base station 120-a; in some embodiments, controller 120-a may be a component of core network 130-a. Base station 105-a and base station 105-b sites may provide communication coverage for a respective geographic area 110-a and 110-b respectively, which may overlap. In some cases, base station 105-a and base station 105-b may be collocated.

The different aspects of system 200 such as the UE 115-a, base stations 105-a/105-b, core network 130-a, and/or controller 120-a may be configured for transitioning between different RATs utilizing system information messages to trigger the transition. For example, UE 115-a may receive a system information message via communication link 125-a from base station 105-a over a first radio access technology (RAT) while in a connected mode with base station 105-a. The communication link 125-a may be referred to, or may include, a radio link between the base station 105-a and the UE 115-a. A transition may be initiated by UE 115-a from the connected mode with the base station 105-a to an idle mode with the base station 105-a in response to the received system information message. A reselection may be performed by UE 115-a from the idle mode with the base station 105-a to a base station 105-b utilizing a second RAT in response to the received system information message; this reselection procedure may utilize communication link 125-b between UE 115-*a* and base station 105-*b*. In some embodiments, the first RAT may include a 3G RAT while the second RAT may include a 4G RAT, although other combinations of RATs are contemplated as well. The transition may occur in some cases when UE 115-*a* is located in an overlapping coverage area between geographic areas 110-*a* and 110-*b*.

Other aspects of system 200, such as core network 130-*a*, controller 120-*a*, and/or base station 105-*a* may be configured to prompt the transition between different RATs, or a transition from base station 105-*a* to base station 105-*b*. For example, base station 105-*a* may be identified as utilizing a first RAT (e.g., 2G or 3G). Base station 105-*b* may be identified as utilizing a second RAT (e.g., 3G or 4G), where the geographic area 110-*b* of base station 105-*b* underlies the geographic area 110-*a* of base station 105-*a*. A system information message, such as a SIB or SI2quater for example, may be generated to prompt user equipment 115-*a* to transition from a connected mode with the base station 105-*a* to an idle mode with the base station 105-*a* and to perform a reselection from the base station 105-*a* to a base station 105-*b* utilizing the second RAT in response to the system information message. The UE 115-*a* may initiate the transition without decoding the received system information message. That is, in some embodiments, the mere presence of certain system information (e.g., SIB19) triggers the UE 115-*a* to initiate the transition. The system information message may be transmitted to the user equipment 115-*a* from base station 105-*a*. In some cases, core network 130-*a* may perform one or more of these steps.

As discussed above, these tools and techniques may address a variety of different problems that may exist in transitioning within multi-RAT deployments. Some embodiments of system 200 may address these issues through utilizing a system information message, such as SIB19 broadcast, of the serving 3G cell, such as a cell associated with base station 105-*a*, and the respective UE detection during 3G RRC connected state as a trigger or indicator for UE 115-*a* initiated combined connected-to-idle mode transition and consecutive 3G to 4G reselection. Based on detection of SIB19 in RRC DCH connected state, the UE 115-*a* may trigger a signaling connection release indication (SCRI), transmitted to base station 105-*a*, in order to initiate a 3G RRC connection release. Once moved to RRC idle by the 3G network, the UE 115-*a* may immediately start a non-blind reselection attempt from 3G to 4G.

As UE 115-*a* may typically be "blind" to the 4G network (e.g., base station 105-*b*) during 3G connected mode (since no compressed mode may be available if 3G to 4G handover is not implemented), the network broadcast of SIB19 on a 3G cell may indicate that there is a high probability and very good chance of an available and underlying 4G coverage. In addition, SIB19 may provide carrier frequency information which will be very beneficial in multi-layer/multi-band LTE deployments and which helps to accelerate the 4G reselection process. The broadcast SIB19 information may lead to an allowed PLMN (HPLMN, EPLMN or VPLMN), which may allow UE 115-*a* to avoid scanning or attempting on non-allowed PLMNs. In addition, some embodiments may allow for preserving the current PDP context and thus may minimize impact on a data session.

Similar tools and techniques may be utilized to transition between different RATS, such as between a 2G (e.g., GSM) to 3G (e.g., UMTS) RAT, such as through utilizing SI2quater messaging. In other examples, the UE 115-*a* may indicate a radio link failure (RLF) of the radio link with, e.g., a 4G RAT serving cell, in order to transition to a 5G RAT target cell. Other message types may also be utilized such as neighbor lists and/or information regarding available or nearby cells that may utilize other RATS.

Figure 3:
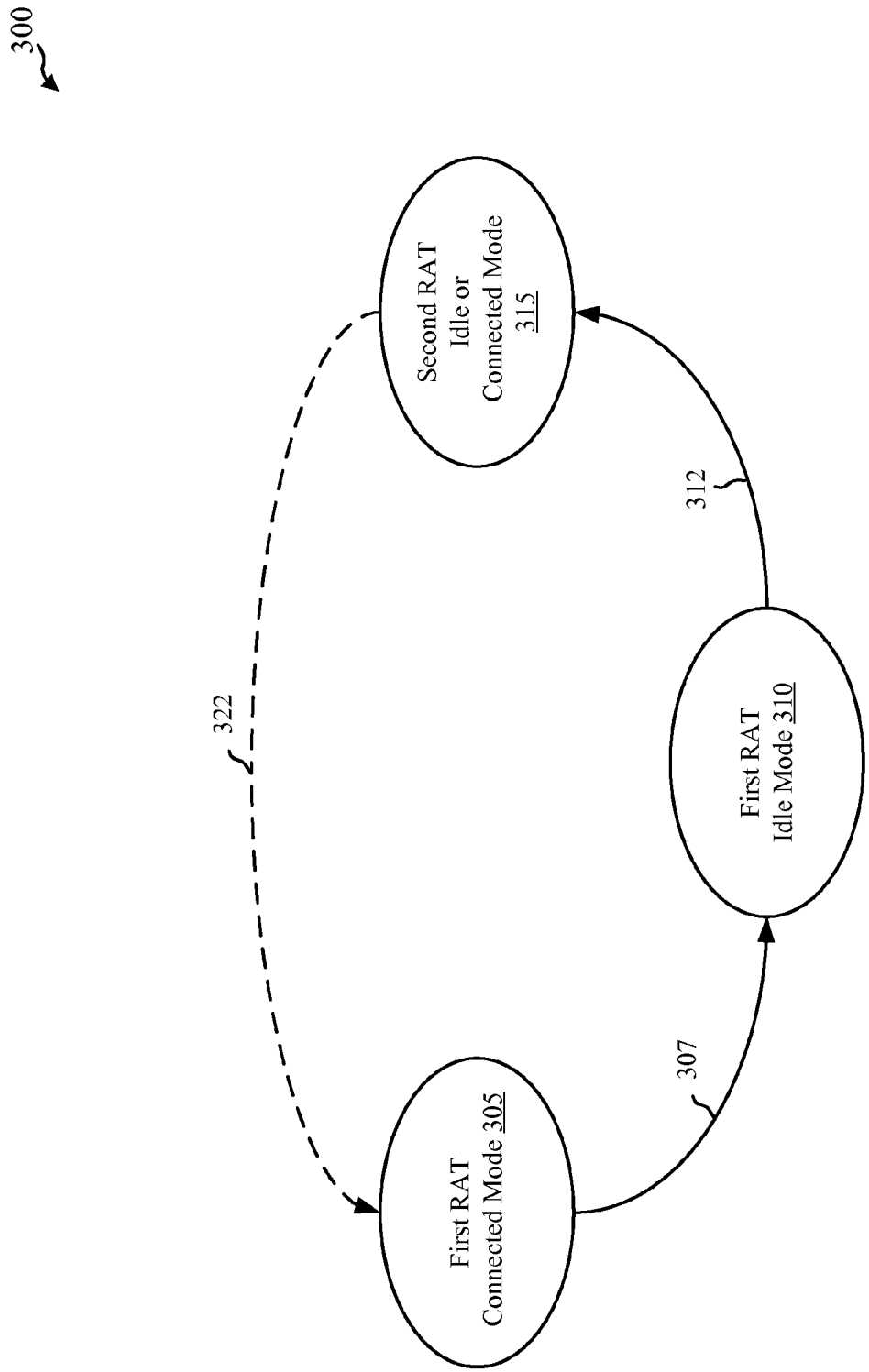
FIG. 3 illustrates a state diagram in accordance with various embodiments.

Turning to FIG. 3, a state diagram 300 is shown in accordance with various embodiments. In some cases, a UE may be in connected mode 305 with a first RAT (e.g., 2G or 3G RAT). A transition 307 to idle mode 310 with respect to the first RAT may be prompted based on receiving a system information message (e.g., SIB19, SI2quater, neighbor list, etc.). The UE may promptly transition 312 from the first RAT idle mode 310 to the second RAT (e.g., 3G or 4G). In some embodiments, initiating the transition may comprise indicating RLF. This may generally involve transition to idle mode with respect to the second RAT. The first RAT and the second RAT are generally different types of RATS. In some cases, the UE may also transition into connected mode with the second RAT. In some cases, the UE may transition 322 from idle or connected mode 315 with respect to the second RAT to the first RAT. This may happen, for example, when the second RAT runs out of coverage or after the UE performs a circuit-switched fallback procedure for a voice call to the first RAT. This may occur before the transitions 307 and/or 312 occur in some cases.

Figure 4A:
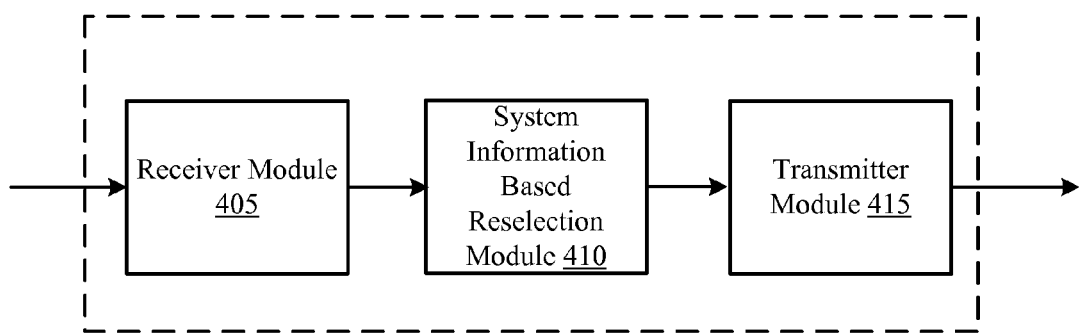
FIG. 4A illustrates a device configured for reselection in accordance with various embodiments.
Figure 4B:
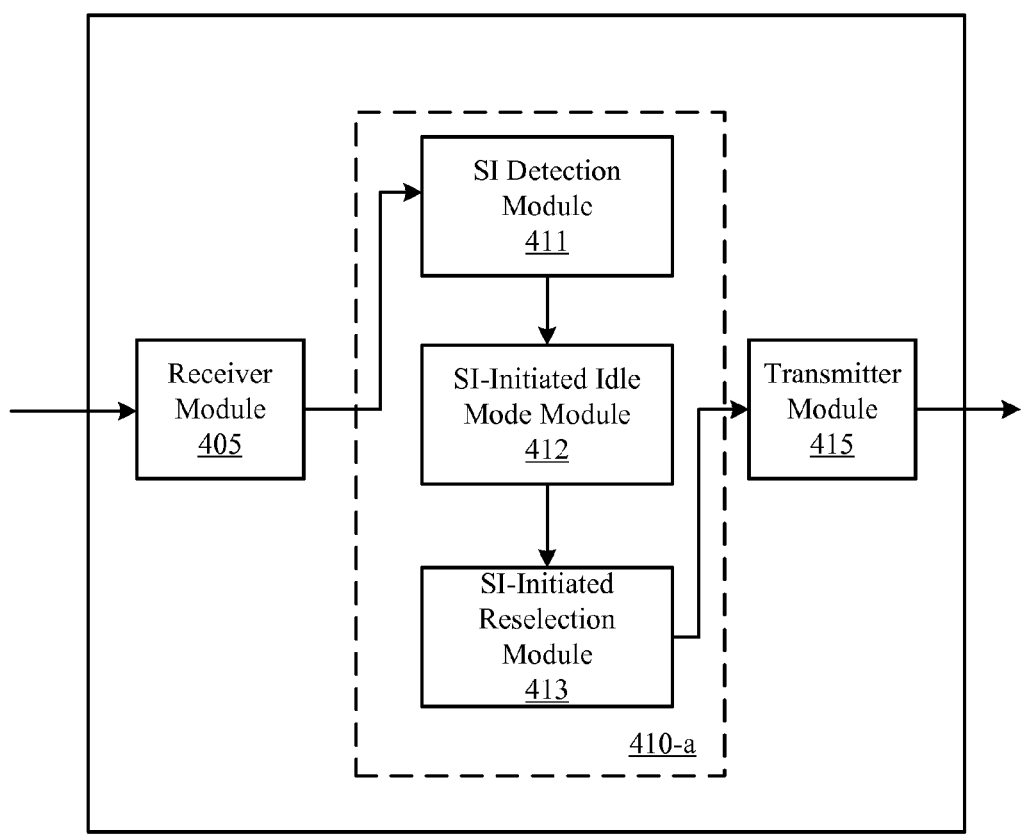
FIG. 4B illustrates a device configured for reselection in accordance with various embodiments.

Turning next to FIG. 4A and FIG. 4B, a block diagram illustrates a device 400-*a* and 400-*b*, respectively, configured for reselection in accordance with various embodiments. The devices 400-*a* and 400-*b* may be an example of aspects of user equipment 115 of FIG. 1, FIG. 2, FIG. 5, FIG. 7, and/or FIG. 8. The devices 400-*a* and 400-*b* may also be a processor. The device 400-*a* may include a receiver module 405, a system information based reselection module 410, and/or a transmitter module 415. The device 400-*b* may include a receiver module 405 and/or a transmitter module 415. The device 400-*b* may include a system information based reselection module 410-*a* that may include a system information (SI) detection module 411, an SI-initiated idle mode module 412, and/or an SI-initiated reselection module 413. Each of these components may be in communication with each other.

These components of the device 400-*a* and/or device 400-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405 may receive information such as packet, data, and/or signaling information regarding what device 400-*a* and/or device 400-*b* has received or transmitted.

In some embodiments, the system information based reselection module 410 and/or the system information based reselection module 410-*a* through the SI detection module 411 may be configured to receive a system information message from a serving cell over a first radio access technology (RAT) while in a connected mode with the serving cell. The system information based reselection module 410 and/or the system information based reselection module 410-*a* through the SI-initiated idle mode module 412 may be configured to initiate a transition from the connected mode with the serving cell to an idle mode with the serving cell in response to the received system information message. The system information based reselection module 410 and/or the system information based reselection module 410-a through the SI-initiated reselection module 413 may be configured to perform a reselection from the idle mode with the serving cell to a target cell utilizing a second RAT in response to the received system information message.

In some embodiments, the system information message includes a system information block (SIB). The SIB may include a SIB19 in some cases. The SIB may include a SI2quater in other cases. The system information message may include a neighbor list. The system information message may include information indicating underlying coverage by the second RAT. In some embodiments, the system information message includes carrier frequency information regarding the second RAT.

In some embodiments, the system information based reselection module 410 and/or the system information based reselection module 410-a through the SI detection module 411 may be configured to receive the system information message during an RRC connected state. The system information based reselection module 410 and/or the system information based reselection module 410-a through the SI-initiated idle mode module 412 configured to initiate the transition may be configured to initiate a connection release in response to the received system information message. Some embodiments may utilize the transmitter module 405 to transmit a signaling connection release indication in order to initiate the connection release. In some cases, the system information based reselection module 410 and/or the system information based reselection module 410-a through the SI-initiated idle mode module 412 may express its wish to release the RRC connection in order to be transitioned to idle through transmitting the connection release message. In other embodiments, the system information based reselection module 410 and/or the system information based reselection module 410-a through the SI-initiated idle mode module 412 and/or the transmitter module 405 may indicate an RLF. In some cases, an RLF is indicated by intentionally transmitting via the transmitter module 405, a number of retransmission requests to a base station 105 such that the number of retransmission requests exceeds a threshold for RLF. In some examples, RLF is indicated by the not transmitting and/or remaining inactive for a threshold period of time.

In some embodiments, the first RAT includes a 3G RAT. The first RAT may include a 2G RAT. In some embodiments, the second RAT includes a 4G RAT. The second RAT may include a 3G RAT. In still other embodiments, the first RAT includes a 4G RAT and the second RAT includes a 5G RAT.

In some embodiments, device 400-a and/or device 400-b may be part of a wireless communications system that does not support, or is configured without support for, an inter-RAT handover from the first RAT to the second RAT and/or autonomous UE handover from the first RAT to the second RAT. In some embodiments, device 400-a and/or device 400-b may be configured to ignore a timer during the idle mode. In some embodiments, device 400-a and/or device 400-b may be configured to forgo utilizing additional system information messages received from the first cell during the idle mode.

In some embodiments, the received system information directs the device 400-a and/or the device 400-b to an allowed PLMN. In some embodiments, device 400-a and/or device 400-b may be configured to preserve a current PDP context from prior to receiving the system information message to after performing the reselection.

In some embodiments, the system information based reselection module 410 and/or the system information based reselection module 410-a, through the SI-initiated idle mode module 412, may be configured to initiate the transition to the idle mode while the device 400-a and/or the device 400-b may expect to receive data from the first cell. In some embodiments, the system information based reselection module 410 and/or the system information based reselection module 410-a, through the SI-initiated reselection module, may be configured to perform a non-blind attempt. The system information based reselection module 410 and/or the system information based reselection module 410-a, through the SI-initiated reselection module, may be configured to perform (e.g., commence) the reselection promptly after transitioning to the idle mode.

Figure 5:
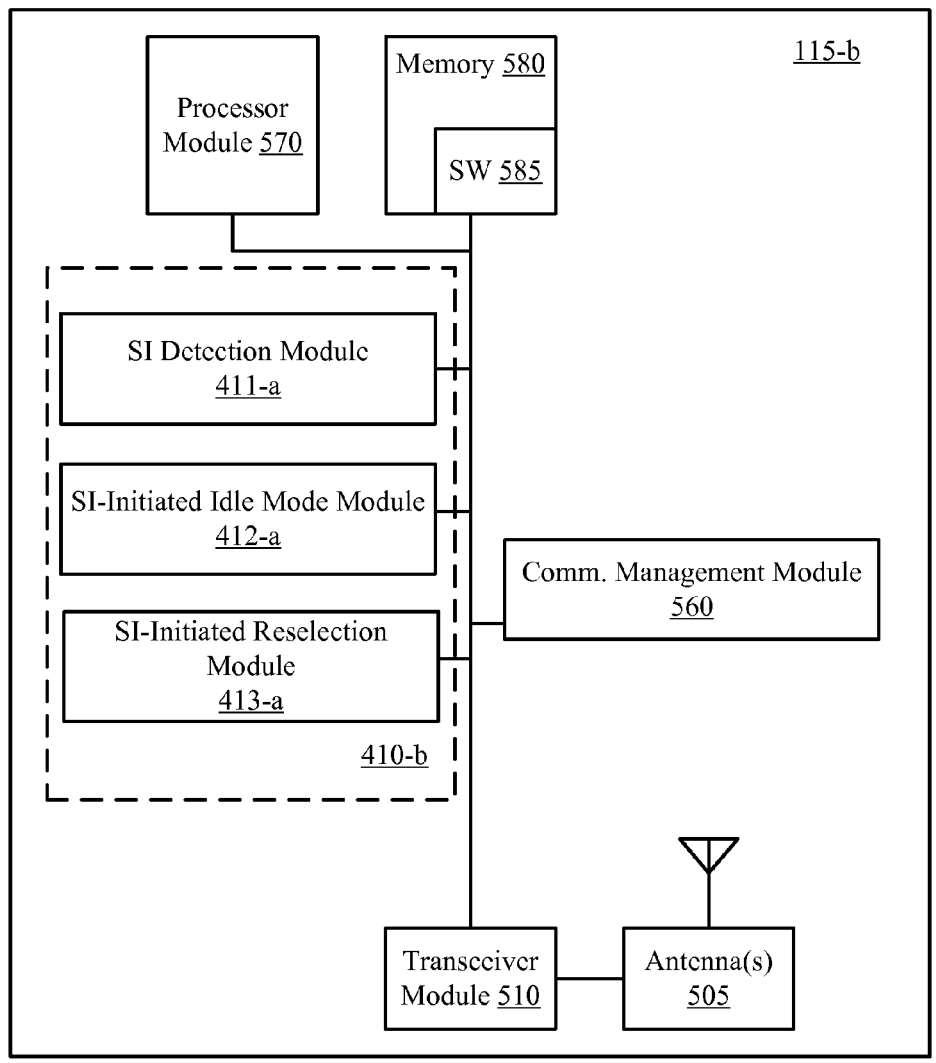
FIG. 5 illustrates a user equipment configured for reselection in accordance with various embodiments.

FIG. 5 is a block diagram 500 of a user equipment 115-b configured for reselection in accordance with various embodiments. The user equipment 115-b may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The user equipment 115-b may have an internal power supply (not shown), such as a small battery, to facilitate mobile operation. In some embodiments, the user equipment 115-b may be the user equipment 115 of FIG. 1, FIG. 2, FIG. 3, FIG. 7 and/or FIG. 8.

The user equipment 115-b may generally include components for bi-directional voice and data communications including components for transmitting communications and components for receiving communications. The user equipment 115-b may include a transceiver module 510, antenna(s) 505, memory 580, and a processor module 570, which each may communicate, directly or indirectly, with each other (e.g., via one or more buses). The transceiver module 510 is configured to communicate bi-directionally, via the antenna(s) 505 and/or one or more wired or wireless links, with one or more networks, as described above. For example, the transceiver module 510 may be configured to communicate bi-directionally with base stations 105 of FIG. 1, FIG. 2, and/or FIG. 8 and/or RAN 121 of FIG. 7. The transceiver module 510 may include a modem configured to modulate the packets and provide the modulated packets to the antenna(s) 505 for transmission, and to demodulate packets received from the antenna(s) 505. While the user equipment 115-b may include a single antenna 505, the user equipment 115-b may have multiple antennas 505 capable of concurrently transmitting and/or receiving multiple wireless transmissions. The transceiver module 510 may be capable of concurrently communicating with multiple eNBs via multiple component carriers.

The memory 580 may include random access memory (RAM) and read-only memory (ROM). The memory 580 may store computer-readable, computer-executable software/firmware code 585 containing instructions that are configured to, when executed, cause the processor module 570 to perform various functions described herein (e.g., call processing, database management, capture of handover delay, etc.). Alternatively, the software/firmware code 585 may not be directly executable by the processor module 570 but be configured to cause a computer (e.g., when compiled and executed) to perform functions described herein.

The processor module 570 may include an intelligent hardware device, e.g., a central processing unit (CPU) such as those made by Intel® Corporation or AMD®, a microcontroller, an application-specific integrated circuit (ASIC), etc. The user equipment 115-b may include a speech encoder (not shown) configured to receive audio via a microphone, convert the audio into packets (e.g., 20 ms in length, 30 ms in length, etc.) representative of the received audio, provide the audio packets to the transceiver module 510, and provide indications of whether a user is speaking.

According to the architecture of FIG. 5, the user equipment 115-*b* may further include communications management module 560 and/or system information based reselection module 410-*b*. System information based reselection module 410-*b* may include SI detection module 411-*a*, SI-initiated idle mode module 412-*a*, and/or SI-initiated reselection module 413-*a*. By way of example, these modules may be components of the user equipment 115-*b* in communication with some or all of the other components of the user equipment 115-*b* via a bus. Alternatively, functionality of these modules may be implemented as a component of the transceiver module 510, as a computer program product, and/or as one or more controller elements of the processor module 570.

The user equipment 115-*b* may be configured for reselection in accordance with various embodiments. The components for user equipment 115-*b* may be configured to implement aspects discussed above with respect to device 400-*a* of FIG. 4A and/or device 400-*b* of FIG. 4B and may not be repeated here for the sake of brevity. For example, the system information based reselection module 410-*b* may be an example of one or more aspects of the system information based reselection module 410 or 410-*a*, the SI detection module 411-*a* may be an example of one or more aspects of the SI detection module 411, the SI-initiated idle mode module 412-*a* may be an example of one or more aspects of the SI-initiated idle mode module 412, and/or the SI-initiated reselection module 413-*a* may be an example of one or more aspects of the SI-initiated reselection module 413.

Figure 6A:
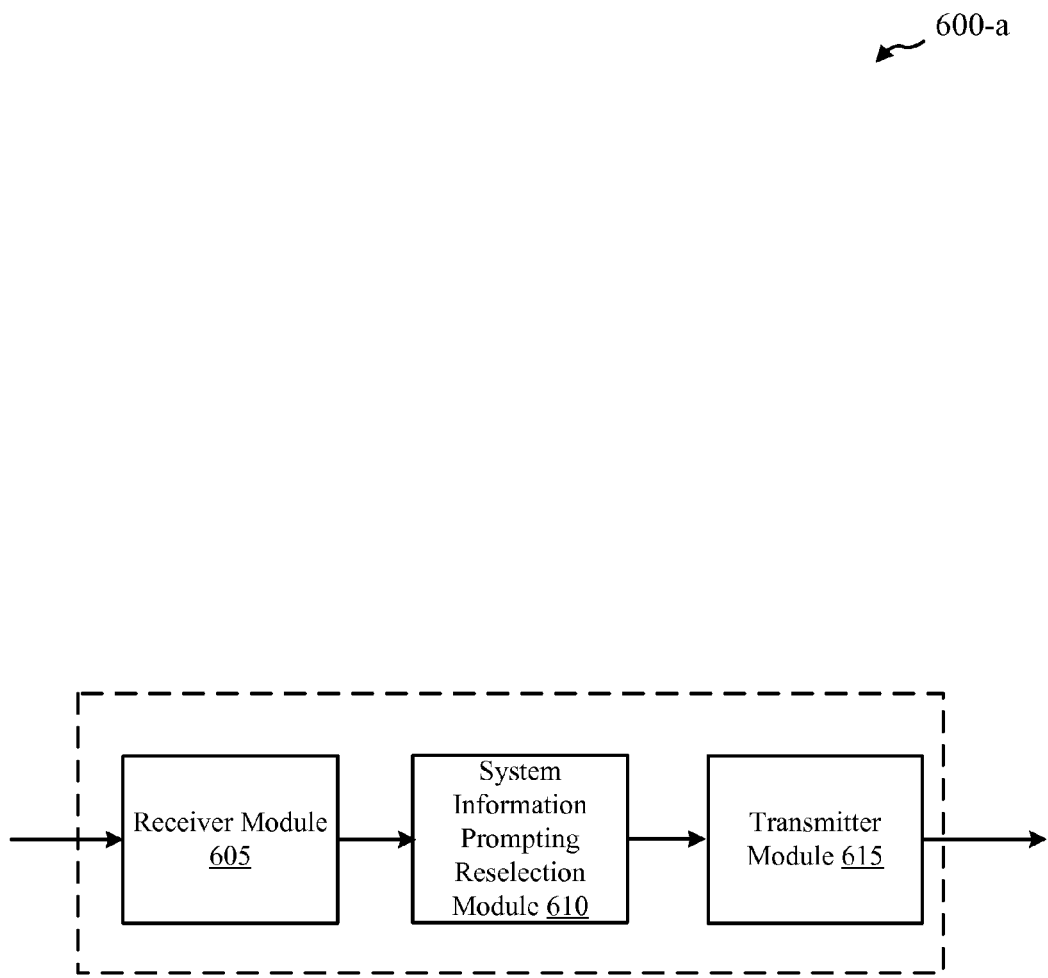
FIG. 6A illustrates a device configured for prompting reselection in accordance with various embodiments.
Figure 6B:
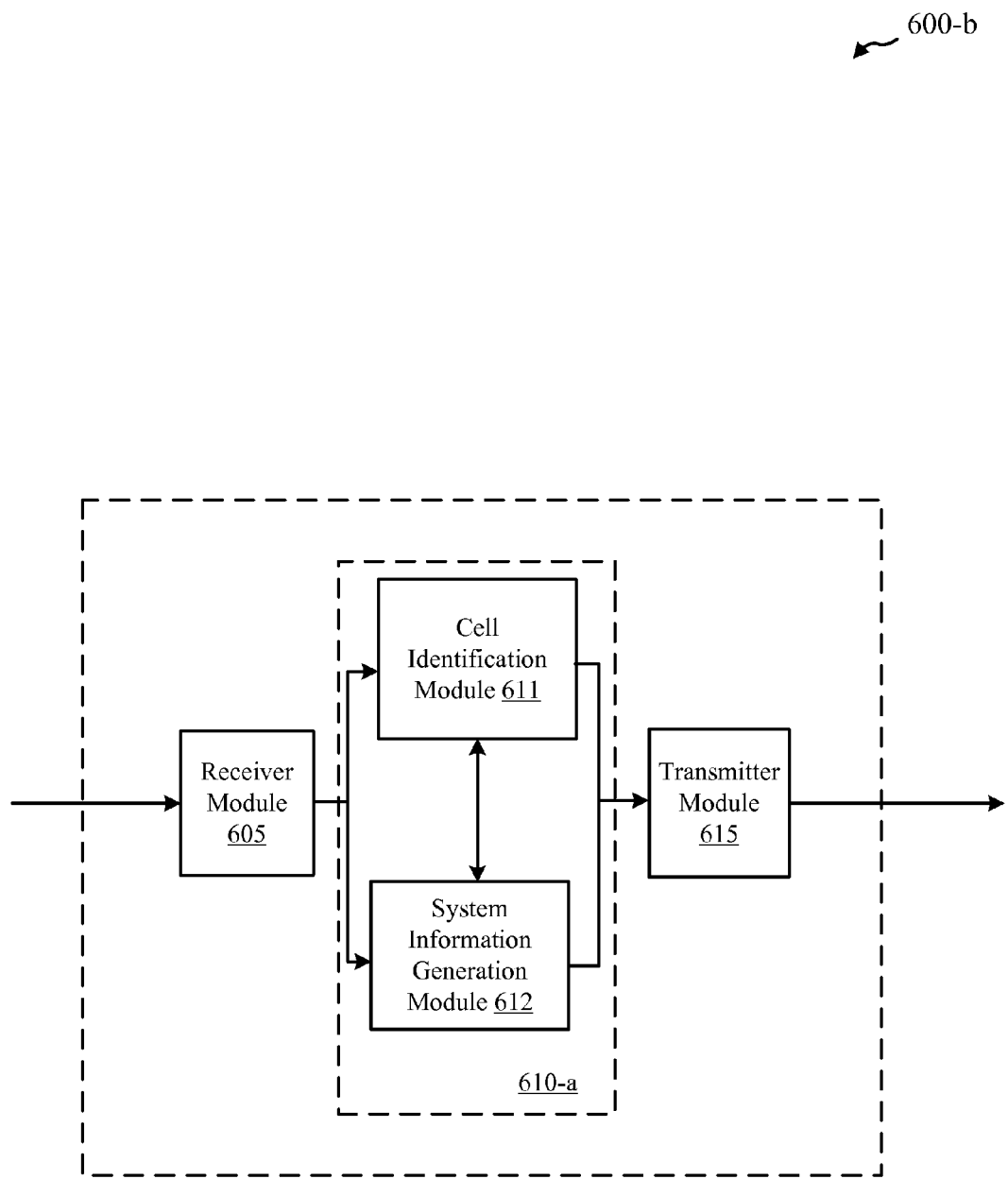
FIG. 6B illustrates a device configured for prompting reselection in accordance with various embodiments.

Turning next to FIG. 6A and FIG. 6B, a block diagram illustrates a device 600-*a* and 600-*b*, respectively, configured for prompting reselection in accordance with various embodiments. The devices 600-*a* and 600-*b* may be an example of aspects of: core network 130 of FIG. 1, FIG. 2, and/or FIG. 7; controller 120 of FIG. 1 and/or FIG. 2; base stations 105 of FIG. 1, FIG. 2, and/or FIG. 8; and/or RAN 121 of FIG. 7. The devices 600-*a* and 600-*b* may also be a processor. The device 600-*a* may include a receiver module 605, a system information prompting reselection module 610, and/or a transmitter module 615. The device 600-*b* may include a receiver module 605 and/or a transmitter module 615. The device 600-*b* may include a system information prompting reselection module 610-*a* that may include a cell identification module 611 and/or a system information generation module 612. Each of these components may be in communication with each other.

These components of the device 600-*a* and/or device 600-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 605 may receive information such as packet, data, and/or signaling information regarding what device 600-*a* and/or device 600-*b* has received or transmitted.

In some embodiments, system information prompting reselection module 610 and/or system information prompting reselection module 610-*a* through cell identification module 611 may be configured to identify a first cell utilizing a first radio access technology (RAT). System information prompting reselection module 610 and/or system information prompting reselection module 610-*a* through cell identification module 611 may be configured to identify a second cell utilizing a second RAT, where a coverage of the second cell underlies the first cell. In some embodiments, system information prompting reselection module 610 and/or system information prompting reselection module 610-*a* through a system information generation module 612 may be configured to generate a system information message to prompt a user equipment to transition from a connected mode with the first cell to an idle mode with the first cell and performing a reselection from the first cell to a target cell utilizing a second RAT in response to the system information message. In some cases, prompting reselection by the UE may include supporting and/or motivating the UE to decide and to proceed to reselection based on receiving the system information message. In some cases, the reselection may involve a UE autonomous decision and process in idle mode, which may be supported and/or potentially motivated by receiving the system information message and/or respective parameter settings. Transceiver module 610 maybe configured to transmit the system information message to the user equipment.

In some embodiments, the system information message includes a system information block (SIB). The SIB may include a SIB19 in some cases. The SIB may include a SI2quater in other cases. The system information message may include a neighbor list. The system information message may include information indicating underlying coverage by the second RAT.

In some embodiments, the transmitter module 610 may be configured to transmit the system information message such that it occurs during an RRC connected state. System information prompting reselection module 610 and/or system information prompting reselection module 610-*a* through cell identification module 611 may be configured to determine that the availability of the second cell. Receiver module 605 may be configured to receive a connection release message in response to the transmitting the system information message in some embodiments. Receiving the connection release message may include receiving a signaling connection release indication in order to initiate the connection release. In some cases, a UE may express its wish to release the RRC connection in order to be transitioned to idle through transmitting a connection release message to device 600-*a* and/or device 600-*b*. Device 600-*a* and/or device 600-*b* may control the RRC state transition.

In some embodiments, the first RAT includes a 3G RAT. The first RAT may include a 2G RAT. In some embodiments, the second RAT includes a 4G RAT. The second RAT may include a 3G RAT. Additionally or alternatively, the first and second RATs may include 4G and 5G RATs respectively.

In some embodiments, device 600-*a* and/or device 600-*b* may be part of a wireless communications system that does not support an inter-RAT handover from the first RAT to the second RAT. In some embodiments, system information prompting reselection module 610 and/or system information prompting reselection module 610-*a* through a system information generation module 612 may be configured to such that transmitted system information directs the UE to an allowed PLMN. Some embodiments of device 600-*a* and/or device 600-*b* may be configured to preserve a current PDP context from prior to receiving the system information message to after performing the reselection. In some embodiments, device 600-*a* and/or device 600-*b* may be part of a wireless communications system that is aware that the UE allows different ways of RAT transition.

Figure 7:
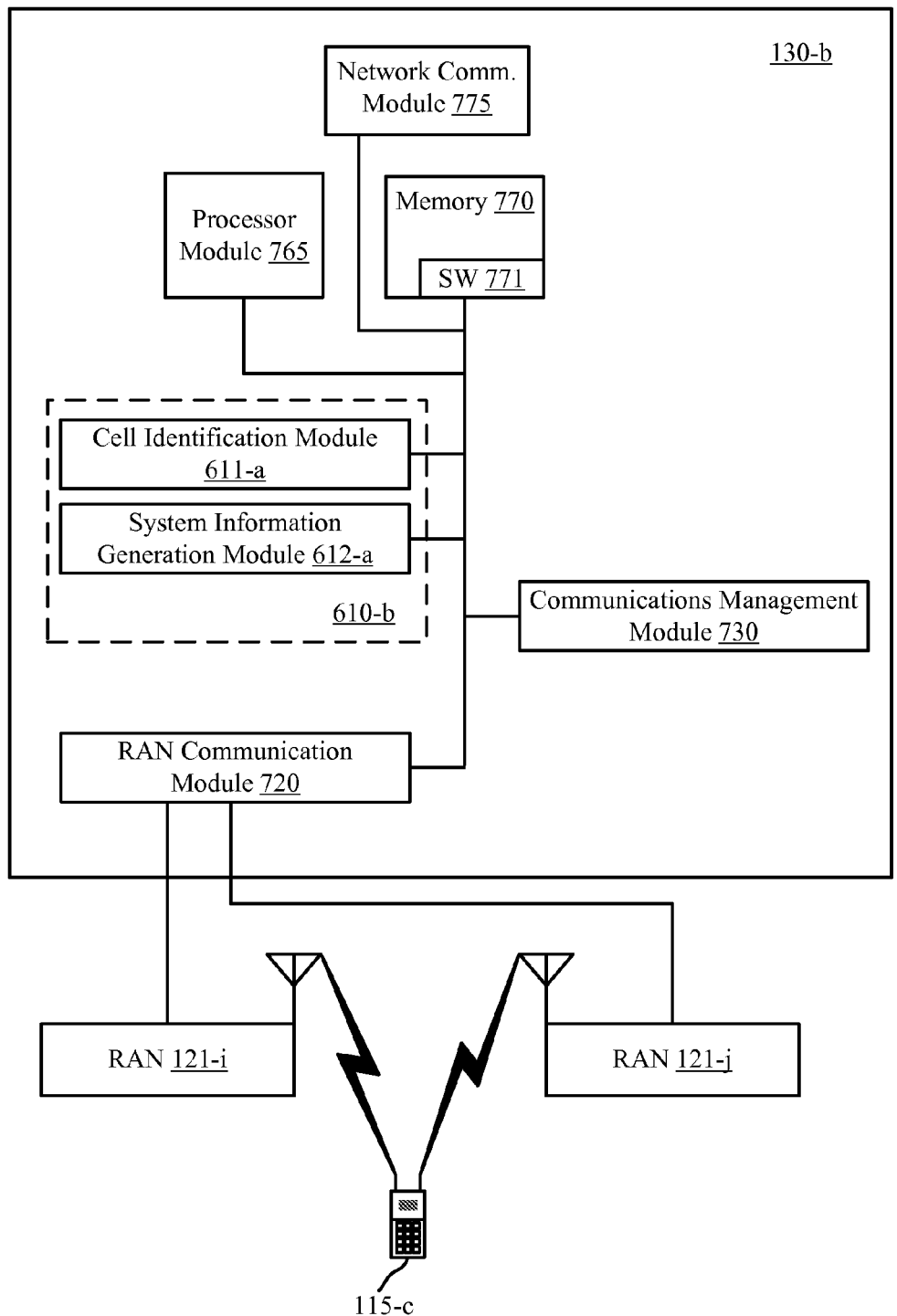
FIG. 7 illustrates a system that includes a network device configured for prompting reselection in accordance with various embodiments.

FIG. 7 shows a block diagram of a communications system 700 that may be configured for utilizing mobility for wireless communications systems in accordance with various embodiments. This system 700 may include aspects of the system 100 depicted in FIG. 1, systems 200 of FIG. 2, and/or system 800 of FIG. 8 The core network 130-b may include memory 770, and a processor module 765, which each may be in communication, directly or indirectly, with each other (e.g., over one or more buses). In some cases, the core network 130-b may communicate with other aspects of the network communications module 775.

Core network 130-b may also communicate with radio access networks (RANs) 121-i/121-j. Radio access networks 121 may be co-located in some cases, or separately located. Radio access networks 121 may be in wireless communication with user equipment 115-c. In some cases, core network 130-b may communicate with radio access networks 121 utilizing radio access network communication module 720. Radio access networks 121 may utilize different radio access technologies (RATs). For example, RAN 121-i may utilize a 3G RAT, while RAN 121-j may utilize a 4G RAT. In another example, RAN 121-i may utilize a 2G RAT, while RAN 121-j may utilize a 3G RAT or a 4G RAT. Alternatively, RAN 121-I may utilize a 4G RAT, while RAN 121-j may utilize a 5G RAT.

The memory 770 may include random access memory (RAM) and read-only memory (ROM). The memory 770 may also store computer-readable, computer-executable software code 771 containing instructions that are configured to, when executed, cause the processor module 765 to perform various functions described herein (e.g., call processing, database management, message routing, etc.). Alternatively, the software 771 may not be directly executable by the processor module 765 but be configured to cause the computer, e.g., when compiled and executed, to perform functions described herein.

The processor module 765 may include an intelligent hardware device, e.g., a central processing unit (CPU) such as those made by Intel® Corporation or AMD®, a microcontroller, an application-specific integrated circuit (ASIC), etc. The processor module 765 may include a speech encoder (not shown) configured to receive audio via a microphone, convert the audio into packets (e.g., 20 ms in length) representative of the received audio, provide the audio packets, and provide indications of whether a user is speaking.

According to the architecture of FIG. 7, the core network 130-b may further include a communications management module 730. The communications management module 730 may manage communications other aspects of communication, such as communication with user equipment 115-c. By way of example, the communications management module 730 may be a component of the core network 130-b in communication with some or all of the other components of the core network 130-b via a bus. Alternatively, functionality of the communications management module 730 may be implemented as a component of the radio access network communications module 720, as a computer program product, and/or as one or more controller elements of the processor module 765.

The components for core network 130-b may be configured to implement aspects discussed above with respect to device 600-a and/or device 600-b and may not be repeated here for the sake of brevity. The system information prompting reselection module 610-b may be an example of system information prompting reselection module 610 and/or system information prompting reselection module 610-a. The cell identification module 611-a may be an example of cell identification module 611. System information generation module 612-may be an example of system information generation module 612.

Figure 8:
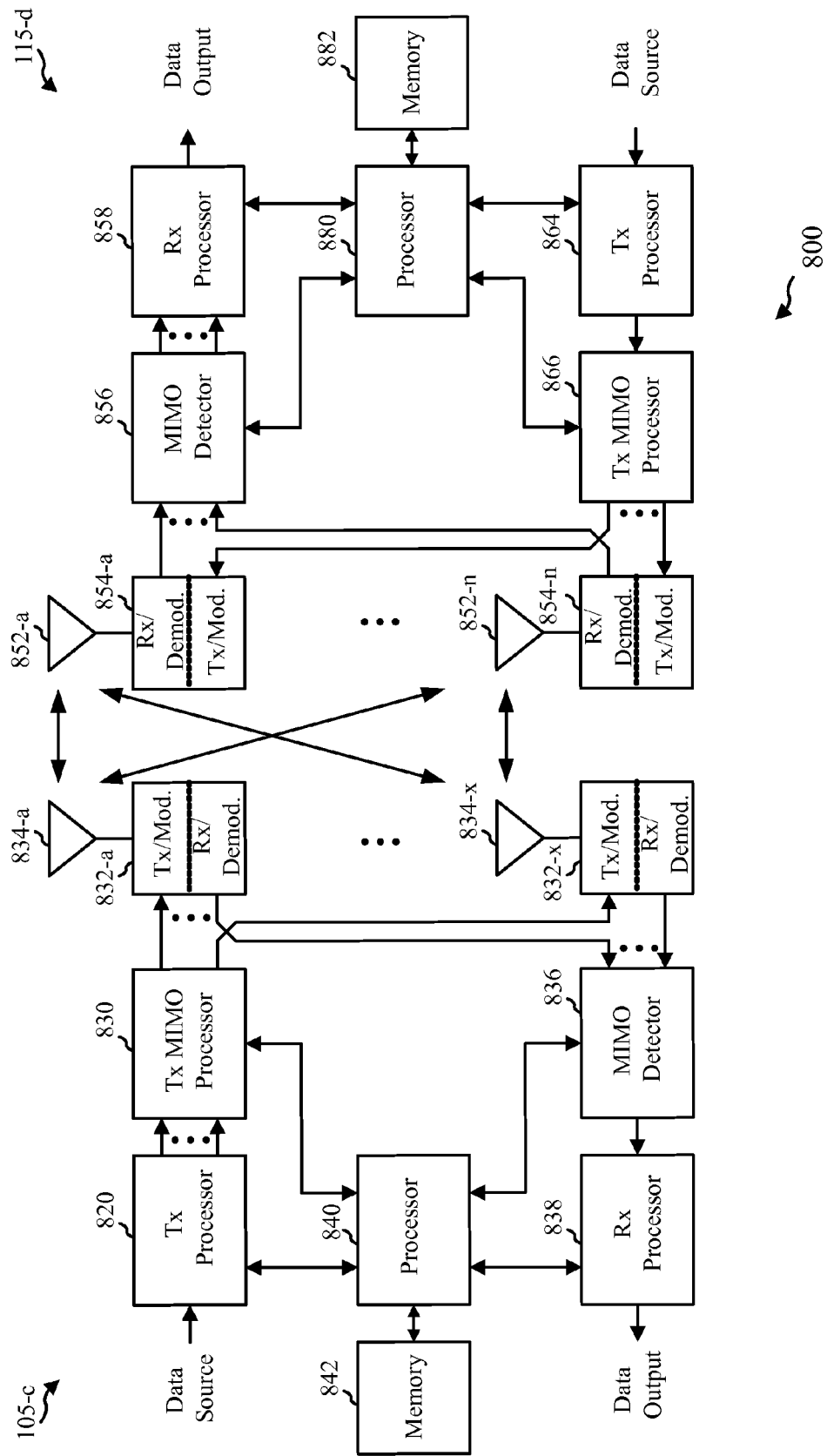
FIG. 8 is a block diagram of a MIMO communication system including a base station and a user equipment in accordance with various embodiments.

FIG. 8 is a block diagram of a system 800 including a base station 105-c and a user equipment 115-d in accordance with various embodiments. This system 800 may be an example of the system 100 of FIG. 1, system 200 of FIG. 2, and/or system 700 of FIG. 7. The base station 105-c may be equipped with antennas 834-a through 834-x, and the user equipment 115-d may be equipped with antennas 852-a through 852-n. At the base station 105-c, a transmit processor 820 may receive data from a data source.

The transmit processor 820 may process the data. The transmit processor 820 may also generate reference symbols, and a cell-specific reference signal. A transmit (TX) MIMO processor 830 may perform spatial processing (e.g., precoding) on data symbols, control symbols, and/or reference symbols, if applicable, and may provide output symbol streams to the transmit modulators 832-a through 832-x. Each modulator 832 may process a respective output symbol stream (e.g., for OFDM, etc.) to obtain an output sample stream. Each modulator 832 may further process (e.g., convert to analog, amplify, filter, and upconvert) the output sample stream to obtain a downlink (DL) signal. In one example, DL signals from modulators 832-a through 832-x may be transmitted via the antennas 834-a through 834-x, respectively. The transmit processor 820 may receive information from a processor 840. The processor 840 may be coupled with a memory 842.

For example, within system 800, the processor 840 may be configured to prompt reselection. For example processor 840 may be configured to identify a first cell utilizing a first radio access technology (RAT). Processor 840 may be configured to identify a second cell utilizing a second RAT, where a coverage of the second cell underlies the first cell. Processor 840 may be configured to generate a system information message to prompt user equipment 115-d to transition from a connected mode with the first cell to an idle mode with the first cell and performing a reselection from the first cell to a target cell utilizing a second RAT in response to the system information message. Tx processor 820 may be configured to transmit the system information message to the user equipment 115-d.

In some embodiments, the system information message includes a system information block (SIB). The SIB may include a SIB19 in some cases. The SIB may include a SI2quater in other cases. The system information message may include a neighbor list. The system information message may include information indicating underlying coverage by the second RAT. In some embodiments, the first RAT includes a 3G RAT. The first RAT may include a 2G RAT or a 4G RAT. In some embodiments, the second RAT includes a 4G RAT. The second RAT may include a 3G RAT or a 5G RAT.

At the user equipment 115-d, the user equipment antennas 852-a through 852-n may receive the DL signals from the base station 105-c and may provide the received signals to the demodulators 854-a through 854-n, respectively. Each demodulator 854 may condition (e.g., filter, amplify, downconvert, and digitize) a respective received signal to obtain input samples. Each demodulator 854 may further process the input samples (e.g., for OFDM, etc.) to obtain received symbols. A MIMO detector 856 may obtain received symbols from all the demodulators 854-a through 854-n, perform MIMO detection on the received symbols, if applicable, and provide detected symbols. A receive processor 858 may process (e.g., demodulate, deinterleave, and decode) the detected symbols, providing decoded data for the user equipment 115-*d* to a data output, and provide decoded control information to a processor 880, or memory 882.

On the uplink (UL) or reverse link, at the user equipment 115-*d*, a transmit processor 864 may receive and process data from a data source. The transmitter processor 864 may also generate reference symbols for a reference signal. The symbols from the transmit processor 864 may be precoded by a transmit MIMO processor 866, if applicable, further processed by the demodulators 854-*a* through 854-*n* (e.g., for SC-FDMA, etc.), and be transmitted to the base station 105-*c* in accordance with the transmission parameters received from the base station 105-*c*.

At the base station 105-*c*, the UL signals from the user equipment 115-*d* may be received by the antennas 834, processed by the demodulators 832, detected by a MIMO detector 836, if applicable, and further processed by a receive processor. The receive processor 838 may provide decoded data to a data output and to the processor 880. In some embodiments, the processor 880 may be implemented as part of a general processor, the transmit processor 864, and/or the receiver processor 858.

In some embodiments, the processor module 880 may be configured for dynamically adapting flexible bandwidth in accordance with various embodiments. The processor 880 may dynamically adjust one or more scale factors of the flexible bandwidth signal associated with transmissions between base station 105-*c* and user equipment 115-*d*. These adjustments may be made based on information such as traffic patterns, interference measurements, etc.

For example, within system 800, the processor 880 may be configured for reselection. For example, processor or other aspects of device 115-*d* may be configured to receive a system information message from a serving cell, such as base station 105-*c*, over a first radio access technology (RAT) while in a connected mode with the serving cell 105-*c*. Processor 880 may be configured to initiate a transition from the connected mode with the serving cell 105-*c* to an idle mode with the serving cell in response to the received system information message. Processor 880 may be configured to perform a reselection from the idle mode with the serving cell to a target cell (not shown) utilizing a second RAT in response to the received system information message. In some embodiments, the system information message includes a system information block (SIB). The SIB may include a SIB19 in some cases. The SIB may include a SI2quater in other cases. The system information message may include a neighbor list. The system information message may include information indicating underlying coverage by the second RAT.

In some embodiments, the first RAT includes a 3G RAT. The first RAT may include a 2G RAT or a 4G RAT. In some embodiments, the second RAT includes a 4G RAT. The second RAT may include a 3G RAT or a 5G RAT.

Figure 9A:
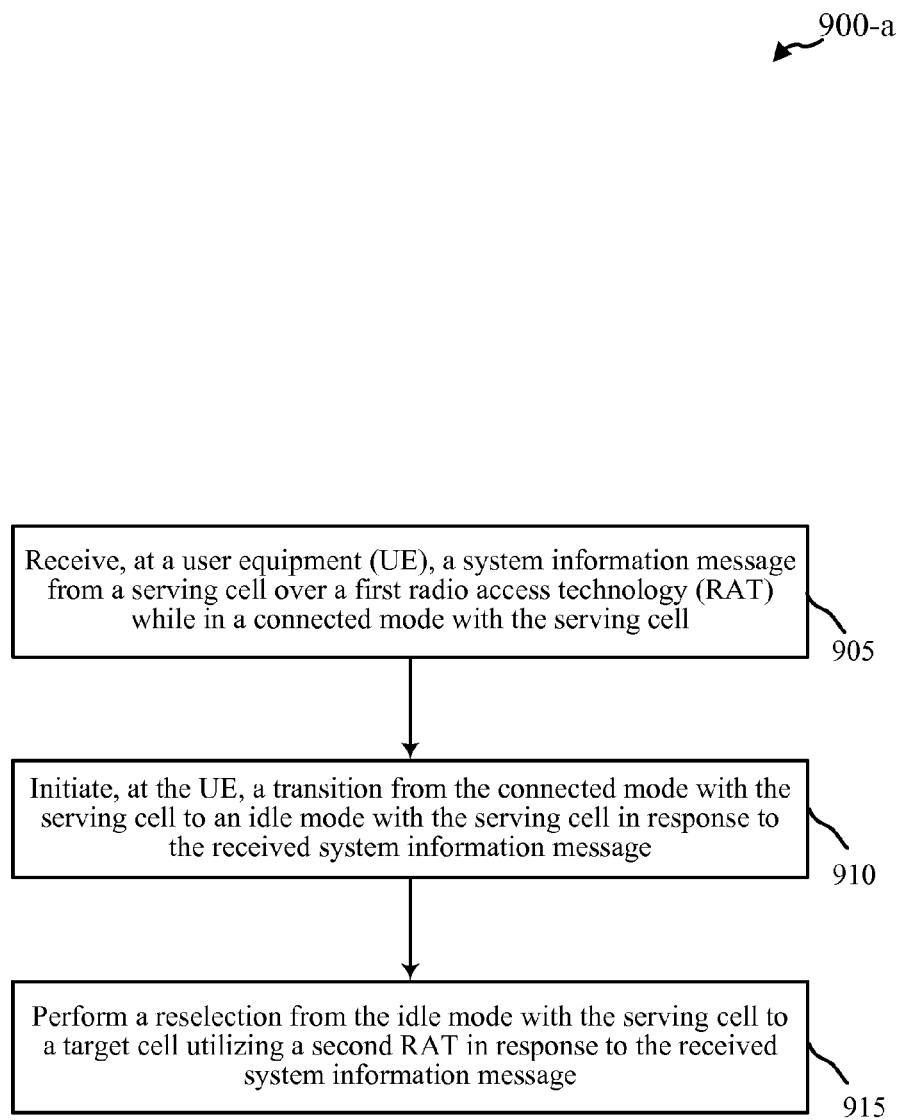
FIG. 9A is a flow diagram of a method of reselection in accordance with various embodiments.

Turning to FIG. 9A, a flow diagram of a method 900-*a* of reselection in a wireless communications system is provided in accordance with various embodiments. Method 900-*a* may be implemented utilizing: user equipment 115 of FIG. 1, FIG. 2, FIG. 5, FIG. 7, and/or FIG. 8; and/or device 400-*a* of FIG. 4A and/or device 400-*b* of FIG. 4B.

At block 905, a system information message may be received from a serving cell over a first radio access technology (RAT) while in a connected mode with the serving cell. At block 910, a transition may be initiated from the connected mode with the serving cell to an idle mode with the serving cell in response to the received system information message. At block 915, a reselection may be performed from the idle mode with the serving cell to a target cell utilizing a second RAT in response to the received system information message.

In some embodiments, the system information message includes a system information block (SIB). The SIB may include a SIB19 in some cases. The SIB may include a SI2quater in other cases. The system information message may include a neighbor list. The system information message may include information indicating underlying coverage by the second RAT.

In some embodiments, receiving the system information message occurs during an RRC connected state. Initiating the transition may include initiating a connection release in response to the received system information message. Initiating the transition may also include indicating a radio link failure (RLF). RLF may be indicated by sending a number of retransmission requests beyond an RLF threshold or going inactive for a period of time. Some embodiments include transmitting a signaling connection release indication in order to initiate the connection release. In some embodiments, the system information message includes carrier frequency information regarding the second RAT.

In some embodiments, the first RAT includes a 3G RAT. The first RAT may include a 2G RAT or a 4G RAT. In some embodiments, the second RAT includes a 4G RAT. The second RAT may include a 3G RAT or a 5G RAT.

In some embodiments, the wireless communications system does not support, or is configured without support for, an inter-RAT handover from the first RAT to the second RAT. Some embodiments include ignoring a timer during the idle mode. Some embodiments include forgoing utilizing additional system information messages received from the first cell during the idle mode.

In some embodiments, the received system information directs the UE to an allowed PLMN. Some embodiments include preserving a current PDP context from prior to receiving the system information message to after performing the reselection.

In some embodiments, initiating the transition to the idle mode occurs while the UE still expects to receive—e.g., the UE is scheduled to receive—data from the first cell. For instance, the UE may have received a forward link or downlink resource grant. In some cases, the reselection includes a non-blind attempt. Performing the reselection may be started promptly after transitioning to the idle mode.

Figure 9B:
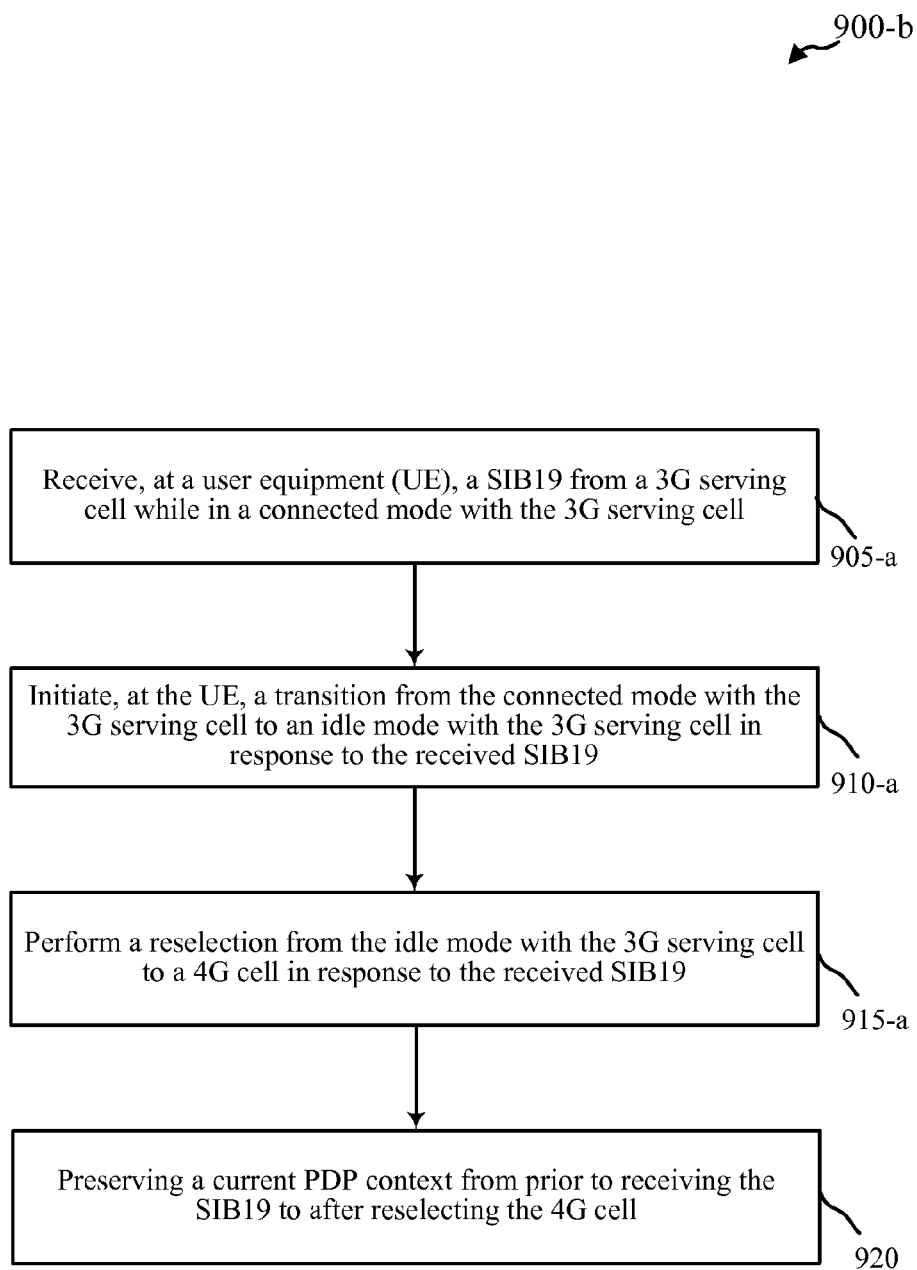
FIG. 9B is a flow diagram of a method of reselection in accordance with various embodiments.

Turning to FIG. 9B, a flow diagram of a method 900-*b* of reselection in a wireless communications system is provided in accordance with various embodiments. Method 900-*b* may be implemented utilizing: user equipment 115 of FIG. 1, FIG. 2, FIG. 5, FIG. 7, and/or FIG. 8; and/or device 400-*a* of FIG. 4A and/or device 400-*b* of FIG. 4B. Method 900-*b* may be an example of method 900-*a* of FIG. 9A.

At block 905-*a*, a SIB19 may be received at a UE from a 3G cell while in a connected mode with the 3G cell. At block 910-*a*, a transition may be initiated by the UE from the connected mode with the 3G cell to an idle mode with the 3G cell in response to the received SIB19. At block 915-*a*, a reselection may be performed from the idle mode with the 3G cell to a 4G cell in response to the received SIB19. At block 920, a current PDP may be preserved from prior to receiving the SIB19 to after reselecting the 4G cell.

Figure 10A:
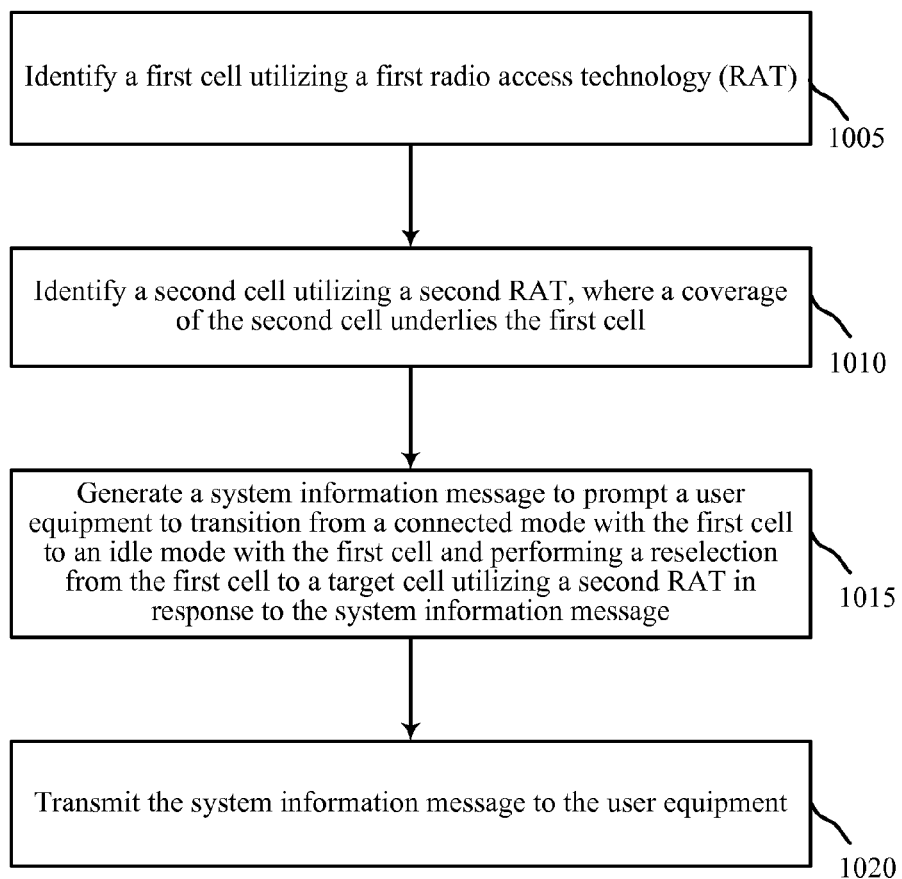
FIG. 10A is a flow diagram of a method of reselection in accordance with various embodiments.

Turning to FIG. 10A a flow diagram of a method 1000-*a* of reselection in a wireless communications system is provided in accordance with various embodiments. Method 1000-*a* may be implemented utilizing: core network 130 of FIG. 1, FIG. 2, and/or FIG. 7; device 600-*a* of FIG. 6A and/or device 600-*b* of FIG. 6B. Some embodiments may be implemented utilizing: controller 120 of FIG. 1 and/or FIG. 2; RAN 121 of FIG. 7; and/or base station 105 of FIG. 1, FIG. 2, and/or FIG. 8.

At block 1005, a first cell utilizing a first radio access technology (RAT) may be identified. At block 1010, a second cell utilizing a second RAT may be identified, where a coverage of the second cell underlies the first cell. At block 1015, a system information message may be generated to prompt a user equipment to transition from a connected mode with the first cell to an idle mode with the first cell and performing a reselection from the first cell to a target cell utilizing a second RAT in response to the system information message. At block 1020, the system information message may be transmitted to the user equipment.

In some embodiments, the system information message includes a system information block (SIB). The SIB may include a SIB19 in some cases. The SIB may include a SI2quater in other cases. The system information message may include a neighbor list. The system information message may include information indicating underlying coverage by the second RAT.

In some embodiments, transmitting the system information message occurs during an RRC connected state. Some embodiments include determining that the availability of the second cell. Some embodiments include receiving a connection release message in response to the transmitting the system information message. Receiving the connection release message may include receiving a signaling connection release indication in order to initiate the connection release.

In some embodiments, the first RAT includes a 3G RAT. The first RAT may include a 2G RAT or a 4G RAT. In some embodiments, the second RAT includes a 4G RAT. The second RAT may include a 3G RAT or a 5G RAT.

In some embodiments, the wireless communications system does not support an inter-RAT handover from the first RAT to the second RAT. In some embodiments, the transmitted system information directs the UE to an allowed PLMN. Some embodiments include preserving a current PDP context from prior to receiving the system information message to after performing the reselection. In some embodiments, the wireless communications system is aware that the UE allows different ways of RAT transition.

Figure 10B:
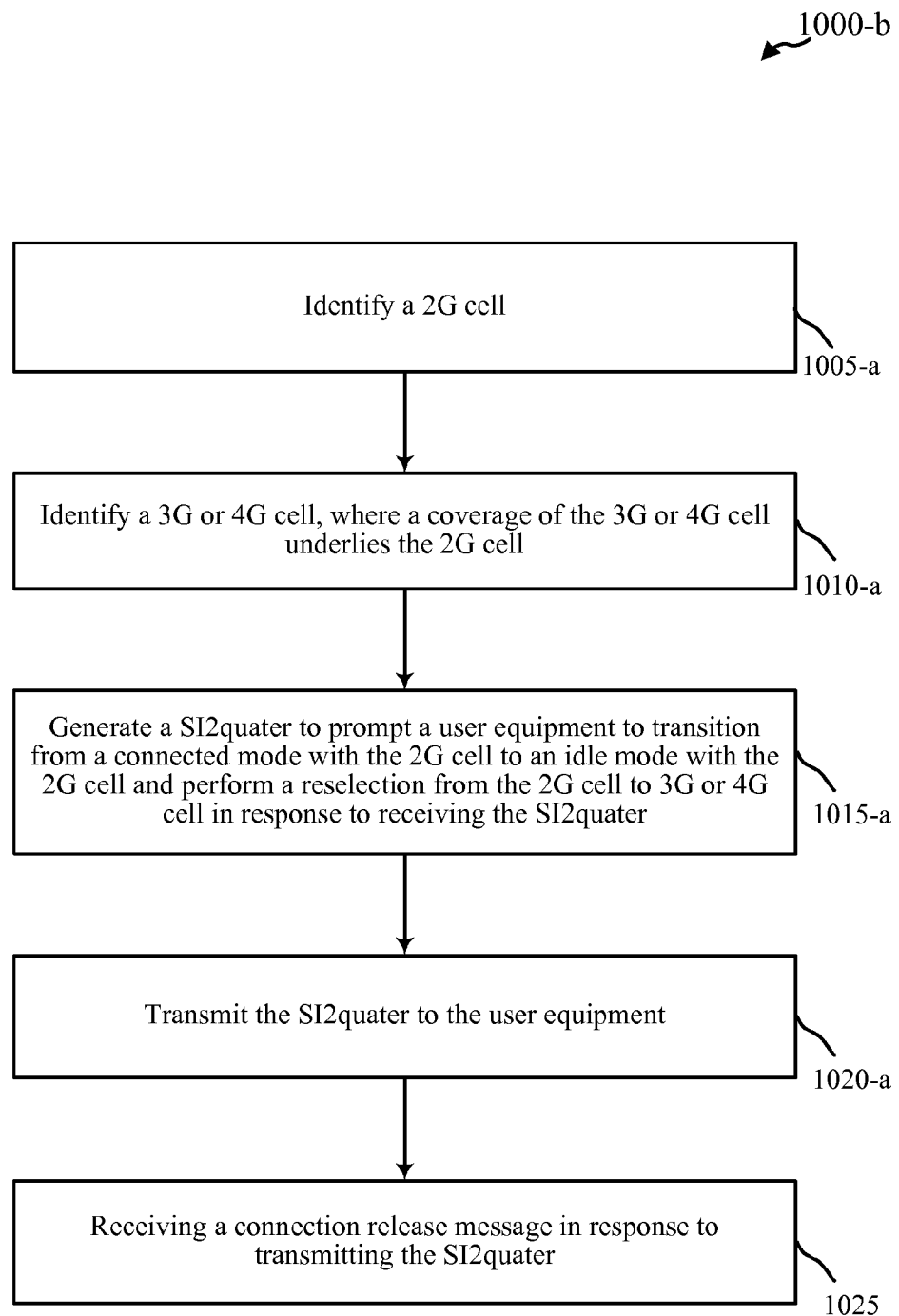
FIG. 10B is a flow diagram of a method of reselection in accordance with various embodiments.

Turning to FIG. 10B, a flow diagram of a method 1000-b of reselection in a wireless communications system is provided in accordance with various embodiments. Method 1000-b may be implemented utilizing: core network 130 of FIG. 1, FIG. 2, and/or FIG. 7; device 600-a of FIG. 6A and/or device 600-b of FIG. 6B. Some embodiments may be implemented utilizing: controller 120 of FIG. 1 and/or FIG. 2; RAN 121 of FIG. 7; and/or base station 105 of FIG. 1, FIG. 2, and/or FIG. 8. Method 1000-b may be an example of method 1000-a of FIG. 10A.

At block 1005-a, a 2G cell may be identified. At block 1010-a, a 3G and/or 4G cell may be identified, where a coverage of the 3G and/or 4G cell underlies the 2G. At block 1015-a, an SI2quater may be generated to prompt a user equipment to transition from a connected mode with the 2G cell to an idle mode with the 2G cell and performing a reselection from the 2G cell to the 3G or 4G cell in response to the SI2quater. At block 1020-a, the SI2quater may be transmitted to the user equipment. At block 1025, a connection release message may be received in response to transmitting the SI2quater.

The detailed description set forth above in connection with the appended drawings describes example embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of reselection in a wireless communications system comprising:
   receiving, at a user equipment (UE), a system information message from a serving cell over a first radio access technology (RAT) while in a connected mode with the serving cell, wherein the system information message comprises a neighbor list, information indicating coverage by a second RAT, carrier frequency information regarding the second RAT, or information directing the UE to an allowed public land mobile network (PLMN);
   initiating, at the UE, a transition from the connected mode with the serving cell to an idle mode with the serving cell in response to the received system information message; and
   performing a reselection from the idle mode with the serving cell to a target cell utilizing the second RAT in response to the received system information message.

2. The method of claim 1, wherein the system information message comprises a system information block (SIB).

3. The method of claim 2, wherein the SIB comprises a SIB 19 or an SI2quater.

4. The method of claim 1, wherein the receiving the system information message occurs during an RRC connected state.

5. The method of claim 1, wherein the initiating the transition comprises initiating a connection release in response to the received system information message.

6. The method of claim 1, wherein the initiating the transition comprises: indicating a radio link failure (RLF) of a radio link with the serving cell.

7. The method of claim 5, further comprising:
   transmitting a signaling connection release indication in order to initiate the connection release.

8. The method of claim 1, wherein the first RAT comprises a 2G RAT, a 3G RAT, or a 4G RAT.

9. The method of claim 1, wherein the second RAT comprises a 4G RAT.

10. The method of claim 1, wherein the wireless communications system is configured without network support for an inter-RAT handover from the first RAT to the second RAT.

11. The method of claim 1, wherein the wireless communications system is configured without support for autonomous handover of the UE from the first RAT to the second RAT.

12. The method of claim 1, further comprising: preserving a current packet data protocol (PDP) context from prior to receiving the system information message at least until after performing the reselection.

13. The method of claim 1, wherein the initiating the transition to the idle mode occurs while the UE is scheduled to receive data from the serving cell.

14. The method of claim 1, wherein the reselection comprises a non-blind attempt.

15. The method of claim 1, wherein the performing the reselection commences promptly after transitioning to the idle mode.

16. A device for wireless communication in a wireless communication system, comprising:
   at least one processor; and
   memory in electronic communication with the at least one processor, the memory storing instructions that, when executed by the at least one processor, cause the device to:
   receive, at a user equipment (UE), a system information message from a serving cell over a first radio access technology (RAT) while in a connected mode with the serving cell, wherein the system information message comprises a neighbor list, information indicating coverage by a second RAT, carrier frequency information regarding the second RAT, or information directing the UE to an allowed public land mobile network (PLMN);
   initiate, at the UE, a transition from the connected mode with the serving cell to an idle mode with the serving cell in response to the received system information message; and
   perform a reselection from the idle mode with the serving cell to a target cell utilizing the second RAT in response to the received system information message.

17. The communications device of claim 16, wherein the system information message comprises a system information block (SIB).

18. The communications device of claim 16, wherein the instructions are executable to cause the device to:
   initiate a connection release in response to the received system information message.

19. The communications device of claim 16, wherein the instructions are executable to cause the device to:
   indicate a radio link failure (RLF) of a radio link with the serving cell.

20. The communications device of claim 18, wherein the instructions are executable to cause the device to:
   transmit a signaling connection release indication in order to initiate the connection release.

21. The communications device of claim 16, wherein the first RAT comprises a 2G RAT, a 3G RAT, or a 4G RAT.

22. The communications device of claim 16, wherein the second RAT comprises a 4G RAT.

23. The communications device of claim 16, wherein the wireless communications system is configured without support for an inter-RAT handover from the first RAT to the second RAT.

24. The communications device of claim 16, wherein the wireless communications system is configured without support for autonomous handover of the UE from the first RAT to the second RAT.

25. The communications device of claim 16, wherein the reselection comprises a non-blind attempt.

26. The communications device of claim 16, wherein the instructions are executable to cause the device to:
   commence the reselection promptly after transitioning to the idle mode.

27. A wireless communications system comprising:
   means for receiving, at a user equipment (UE), a system information message from a serving cell over a first radio access technology (RAT) while in a connected mode with the serving cell, wherein the system information message comprises a neighbor list, information indicating coverage by a second RAT, carrier frequency information regarding the second RAT, or information directing the UE to an allowed public land mobile network (PLMN);

means for initiating, at the UE, a transition from the connected mode with the serving cell to an idle mode with the serving cell in response to the received system information message; and means for performing a reselection from the idle mode with the serving cell to a target cell utilizing the second RAT in response to the received system information message.

28. A non-transitory computer-readable medium storing code for wireless communication, the code comprising instructions executable for:

receiving, at a user equipment (UE), a system information message from a serving cell over a first radio access technology (RAT) while in a connected mode with the serving cell, wherein the system information message comprises a neighbor list, information indicating coverage by a second RAT, carrier frequency information regarding the second RAT, or information directing the UE to an allowed public land mobile network (PLMN);

initiating, at the UE, a transition from the connected mode with the serving cell to an idle mode with the serving cell in response to the received system information message; and performing a reselection from the idle mode with the serving cell to a target cell utilizing the second RAT in response to the received system information message.

* * * * *